United States Patent
Al Ani

(10) Patent No.: US 11,012,637 B2
(45) Date of Patent: May 18, 2021

(54) SYSTEMS AND METHODS FOR LIVE VIDEO FREEZE DETECTION

(71) Applicant: Ford Global Technologies, LLC, Dearborn, MI (US)

(72) Inventor: Mohammed Al Ani, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 155 days.

(21) Appl. No.: 16/265,585

(22) Filed: Feb. 1, 2019

(65) Prior Publication Data

US 2020/0252552 A1    Aug. 6, 2020

(51) Int. Cl.
| | | |
|---|---|---|
| G06K 9/00 | (2006.01) |
| H04N 5/265 | (2006.01) |
| G06F 3/0481 | (2013.01) |
| H04N 17/00 | (2006.01) |
| B60R 1/00 | (2006.01) |
| H04N 17/04 | (2006.01) |

(52) U.S. Cl.
CPC ............... *H04N 5/265* (2013.01); *B60R 1/00* (2013.01); *G06F 3/04817* (2013.01); *H04N 17/002* (2013.01); *H04N 17/04* (2013.01); *B60R 2300/30* (2013.01); *B60R 2300/8066* (2013.01)

(58) Field of Classification Search
CPC ............ C08G 59/4021; C08G 59/4207; C08G 59/4284; B60R 1/00; B60R 2300/30; B60R 2300/8066; G06F 3/04817; H04N 17/002; H04N 17/04; H04N 5/265

See application file for complete search history.

(56) References Cited

U.S. PATENT DOCUMENTS

| | | |
|---|---|---|
| 6,906,743 B1 | 6/2005 | Maurer |
| 8,165,226 B2 | 4/2012 | Schnebly |
| 8,515,241 B2 | 8/2013 | Forsyth et al. |
| 9,826,252 B2 | 11/2017 | Wendel et al. |
| 2003/0110516 A1 | 6/2003 | Chang et al. |
| 2010/0048288 A1* | 2/2010 | Canterbury ......... G07F 17/3211 463/20 |
| 2010/0074535 A1* | 3/2010 | Bennett ................... H04N 19/59 382/209 |
| 2017/0158131 A1 | 6/2017 | Friebe |
| 2017/0324889 A1* | 11/2017 | Nevatie ................ H04N 5/2723 |
| 2018/0295400 A1* | 10/2018 | Thomas ................. H04N 19/30 |
| 2019/0304506 A1* | 10/2019 | Michaud ................ G11B 27/00 |

* cited by examiner

*Primary Examiner* — Xin Jia
(74) *Attorney, Agent, or Firm* — Frank Lollo; Eversheds Sutherland (US) LLP

(57) ABSTRACT

Vehicle, method, and system are disclosed for determining when a live video feed is frozen. An example vehicle includes a camera, a display, and a processor. The processor is configured to capture a plurality of image frames via the camera, select one or more of the image frames, replace one or more pixels of the selected image frames with an icon, and output the plurality of image frames on the display.

16 Claims, 5 Drawing Sheets

SYSTEMS AND METHODS FOR LIVE VIDEO FREEZE DETECTION

TECHNICAL FIELD

The present disclosure generally relates to vehicle cameras and the display of images and video captured by the vehicle cameras.

BACKGROUND

A vehicle rear view camera enables the driver to see what is behind the vehicle, particularly when the vehicle is shifted in reverse. The camera is typically mounted at the rear of the vehicle and has a rearward facing field of view. The camera generates a video of the area behind the vehicle viewed by the camera. A display inside the vehicle displays the video for the driver to view.

A failure of the camera and/or display may result in the video being frozen on the display. The video may freeze with a frozen image displayed on the display without any warning notifying the driver that the image is frozen. In such an event, it may be difficult for the driver to distinguish between a frozen image and a live video of a static environment. This is particularly problematic when the video freezes while no obstacles are present behind the vehicle and then an obstacle subsequently enters the area behind the vehicle. In this case, the obstacle will not be displayed on the display. The driver viewing the frozen image will therefore not see the obstacle on the display and may proceed with the vehicle backup maneuver.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

A vehicle is disclosed having a camera, a display, and a processor. The processor is configured to capture a plurality of image frames via the camera, select one or more of the image frames, replace one or more pixels of the selected image frames with an icon, and output the plurality of image frames on the display.

A method is disclosed to enable a user to quickly determine whether a camera feed has frozen. The method includes capturing, via a camera, a plurality of image frames, selecting one or more of the image frames, replacing one or more pixels of each selected image frame with an icon, and outputting the plurality of image frames on a display.

A system is disclosed including a camera, a display, and a processor. The processor is configured to capture a plurality of image frames via the camera, select one or more of the image frames, replace one or more pixels of the selected image frames with an icon, and output the plurality of image frames on the display.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
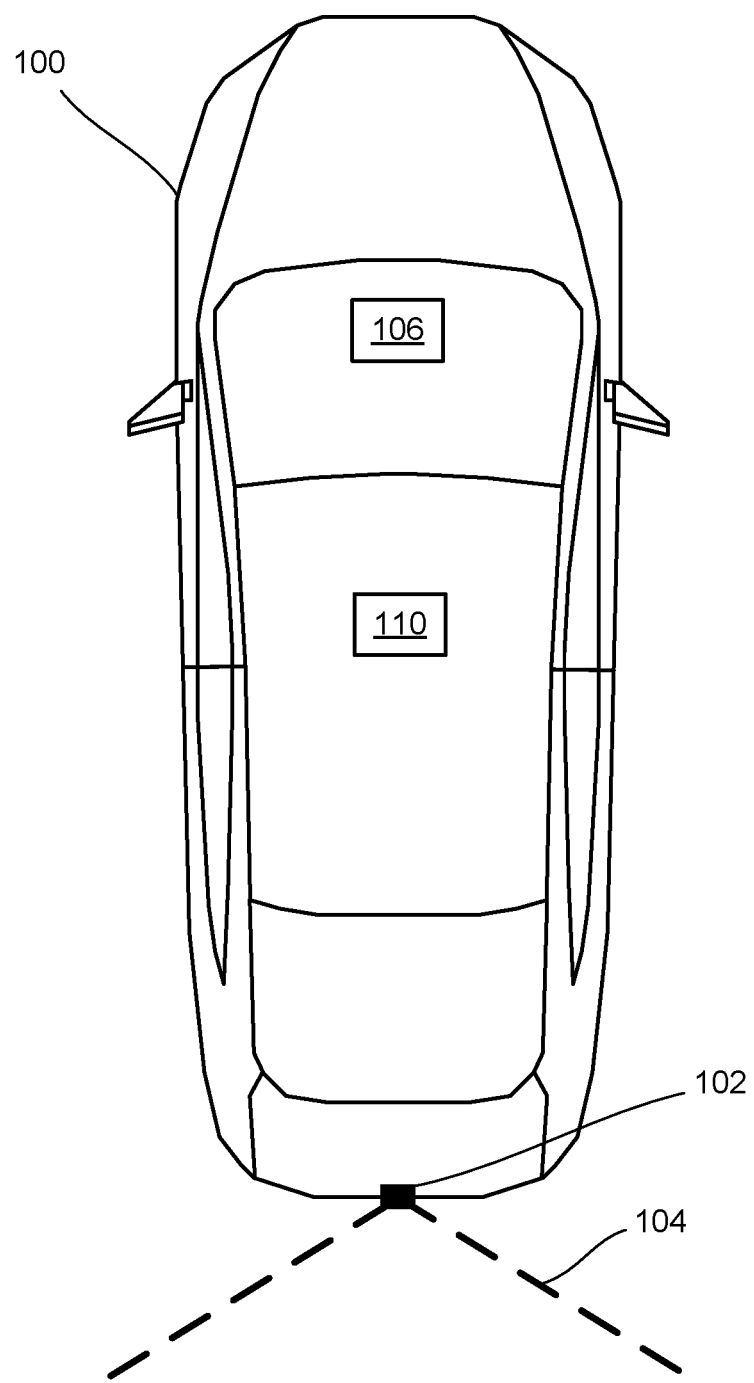
FIG. 1 illustrates a vehicle according to embodiments of the present disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

As noted above, vehicles may include rear facing cameras that allow the driver to see behind the vehicle, particularly when the vehicle is in reverse. The displayed video feed allows the user to avoid backing into obstacles. The camera captures images, which are then displayed on a screen to the driver inside the vehicle.

Some failure modes of the camera and display system may result in a frozen display. The driver may be unaware that the display is frozen, and/or that the images are not being updated. Without an indication that the display is updated, the driver can be unaware that the images displayed are not accurate. In some cases a moving object may be overlaid on the video feed to indicate when the feed is live or if it has frozen. In some cases, however, if the camera freezes but the display does not, the images may be frozen even while the overlaid object continues to move. The frozen video will not be reflected by a frozen overlaid object, and thus the driver or other viewer will incorrectly assume that the video remains live and unfrozen.

Embodiments of the present disclosure attempt to reduce the safety concerns caused by the issues noted above. In some embodiments, a moving, blinking, or otherwise time-variant icon may be inserted into the captured video frames themselves. This can be done by reading each video frame as a matrix of specific color space values (e.g. RGB, YUV, CIE), and replacing certain pixels with an icon. The icon can be inserted into every frame, or only a subset of the frames. The icon is then integral with the image frames, and when the images frames are displayed the icon will be displayed as well. The icon may be changed from frame to frame (or inserted only into selected frames), so that a user viewing the display can immediately determine whether the video feed is frozen or not. If the camera itself freezes, the displayed frames will look frozen to the user since the icon will remain unchanged over time (i.e., the same image frame is continuously displayed). Similarly, if the display itself freezes, the user will also be immediately made aware, since the image and icon will look frozen. In other words, regardless of where the fault lies, (e.g., with the camera or with the display), the same resulting frozen icon and image will be seen by the user, enabling the user to immediately determine when a problem has occurred.

FIG. 1 illustrates an example vehicle 100 according to embodiments of the present disclosure. Vehicle 100 may be a standard gasoline powered vehicle, a hybrid vehicle, an electric vehicle, a fuel cell vehicle, or any other mobility implement type of vehicle. Vehicle 100 may be non-autonomous, semi-autonomous, or autonomous. Vehicle 100 may include parts related to mobility, such as a powertrain with an engine, a transmission, a suspension, a driveshaft, and/or wheels, etc. In the illustrated example, vehicle 100 may include one or more electronic components. Vehicle 100 may include a camera 102, a display 106, and a processor 110. In some examples the camera 102, display 106, and processor 110 may be all or part of a system for live video feed freeze detection.

The camera 102 may be a rear view or backup camera of the vehicle 100. The camera 102 may be mounted to the rear of the vehicle such that it has a rearward facing field of view 104. Camera 102 may capture image frames and/or video comprising the field of view 104. These images may be output or shown on the display 106. This allows a driver of the vehicle 100 to see the area behind the vehicle.

The display 106 may be any screen or visual output device configured to enable a user of the vehicle 100 to view captured images. The display 106 may display images captured by the camera 102, including both unaltered image frames as well as image frames that have been altered to include an icon. The display 106 may be positioned in any location within the vehicle, such as a center console, side arm rest, or overhead console. In some examples, the display may be a mobile device such as a smartphone. The display 106 may be any screen or visual output device configured to be communicatively coupled to the processor 110 and/or camera 102.

The processor 110 may be configured to control one or more vehicle systems or devices, such as the camera 102 and the display 106. In some examples, such as where the display 106 is that of a mobile device, the processor 110 may be configured to wirelessly communicate with the mobile device including the display 106.

The processor 110 may be configured to carry out one or more functions or actions with respect to the camera 102 and the display 106. For example, the processor 110 may be configured to capture a plurality of image frames via the camera. Each image frame may comprise an array of pixels, which can be captured and stored by the processor (and a corresponding memory) in a sequential manner. Each pixel may have one or more characteristics or values associated with it, such as a Red Green Blue (RGB) value (or any other color space), a vertical and horizontal location (XY) value, and more.

The processor 110 can also insert an icon into the video feed by replacing pixels of one or more of the received image frames. In some examples, the processor may select a subset of the image frames, such as every other image frame or every fifth image frame. The frames may be selected based on a predetermined pattern or frequency. For example, the pattern may including selecting every other frame, every fifth frame, or frames according some other pattern. Similarly, frames may be selected at a predetermined frequency, such as five frames per second, or at some other frequency. The processor 110 can also select sets of successive image frames, such as five in a row, then not select the next five, and then select the following five frames.

This can be done by arranging the image frames sequentially in time, and selecting every other (or every fifth) image frame, or any other subset of image frames. Other subsets can be selected as well, including every third frame, or some other number, combination, or arrangement of frames. In addition, some examples may include selecting frames at regular intervals (e.g., every fifth frame), while other examples may include selecting frames at irregular or random intervals or spacing between selected frames.

Processor 110 may also be configured to determine one or more characteristics of an icon that will be inserted into one or more of the selected frames. Example characteristics of the icon can include a size, shape, color, orientation, movement, change in size, animation, or any other time-variant or time-invariant characteristic.

In some examples, the icon may be a static icon. The static icon may be inserted into the selected image frames and may have a characteristic that does not vary from frame to frame (e.g., the same color and shape in each selected image frame). This may be particularly useful where the processor 110 selects image frames with some spacing between them. The resulting video, when viewed at an appropriate frame rate, may display a flashing or blinking icon to a user.

In some examples, the icon may be a dynamic icon. The dynamic icon may have one or more characteristics that change over time. For example, the icon may be a circle having four sections similar to pizza slices, and a first selected image frame may have an upper right quadrant filled in, while a second selected image frame may have a lower right quadrant filled in. The resulting displayed video, when viewed at an appropriate frame rate, may display a rotating wheel. In some examples, the dynamic icon may be static for a period of time or for a certain number of selected image frames, and then changed for a next period of time or number of selected image frames. For instance, in the above described example the upper right quadrant may be filled in for a first series of 30 frames, and the lower right quadrant may be filled in for the next series of 30 frames. In this way, the change in the icon over time (i.e., the movement or animation) can be done at an appropriate rate such that a user can determine whether the icon has stopped changing or not and thus that the video is frozen. In some cases, where a dynamic icon is selected the processor 110 may select all image frames, and display the dynamic icon changing over time via the image frames. Alternatively, the processor 110 may select only a subset of image frames, such that the dynamic icon changes a characteristic (such as which slice is filled in) over time in addition to blinking or flashing via inclusion in only a subset of the processed image frames.

In some examples, the icon may be both static and dynamic, such that a first part or a first subset of the pixels that make up the icon are static, while a second part or a second subset of the pixels are dynamic.

In some examples, an icon position may be static with respect to the selected image frames. In these examples, a center location of the icon may be in the same position on each selected image frame. This enables the icon to remain in the same location on the display as the frames are displayed. Alternatively, the icon position may be dynamic with respect to the selected image frames. In these examples, the center location of the icon may change between one or more adjacent selected image frames. This enables the icon to move around the display as the frames are displayed.

To insert the icon into the image frames, the processor 110 may be configured to replace one or more pixels of the selected images frames with corresponding pixels of the icon. This can include changing the color space (e.g. RGB, YUV) value of one or more pixels, or changing some other characteristic of the pixels.

In some examples, the processor 110 may be configured to replace the one or more pixels of the selected images frames as they are captured by the camera. For example, for a given selected image frame, the camera may capture the pixels in an array. As the array of pixels is processed and stored by the processor 110 and a corresponding memory, the processor may replace certain selected pixels to create the icon. This replacement can occur in the image processing pipeline, such that there is a "checkpoint" in the image capturing process that overwrites certain icon pixels of the selected image frames before the rest of the pixels of the image are allowed to pass through. The image frame pixels are processed sequentially, such that the image frame output includes the icon integrally with the image frame, and the icon is a part of the image frame itself. In other words, the pixels of the image frame are replaced with the icon simultaneously with the capturing of the image frame.

Processor 110 may then subsequently display the image frames via display 106, including both the frames that were selected including the icon, as well as those frames which were not selected. This enables the processor and display to show the video feed images having the icon blinking, flashing, moving, rotating, or otherwise changing over time. The user can then determine based on the icon whether the video feed has frozen.

Figure 2:
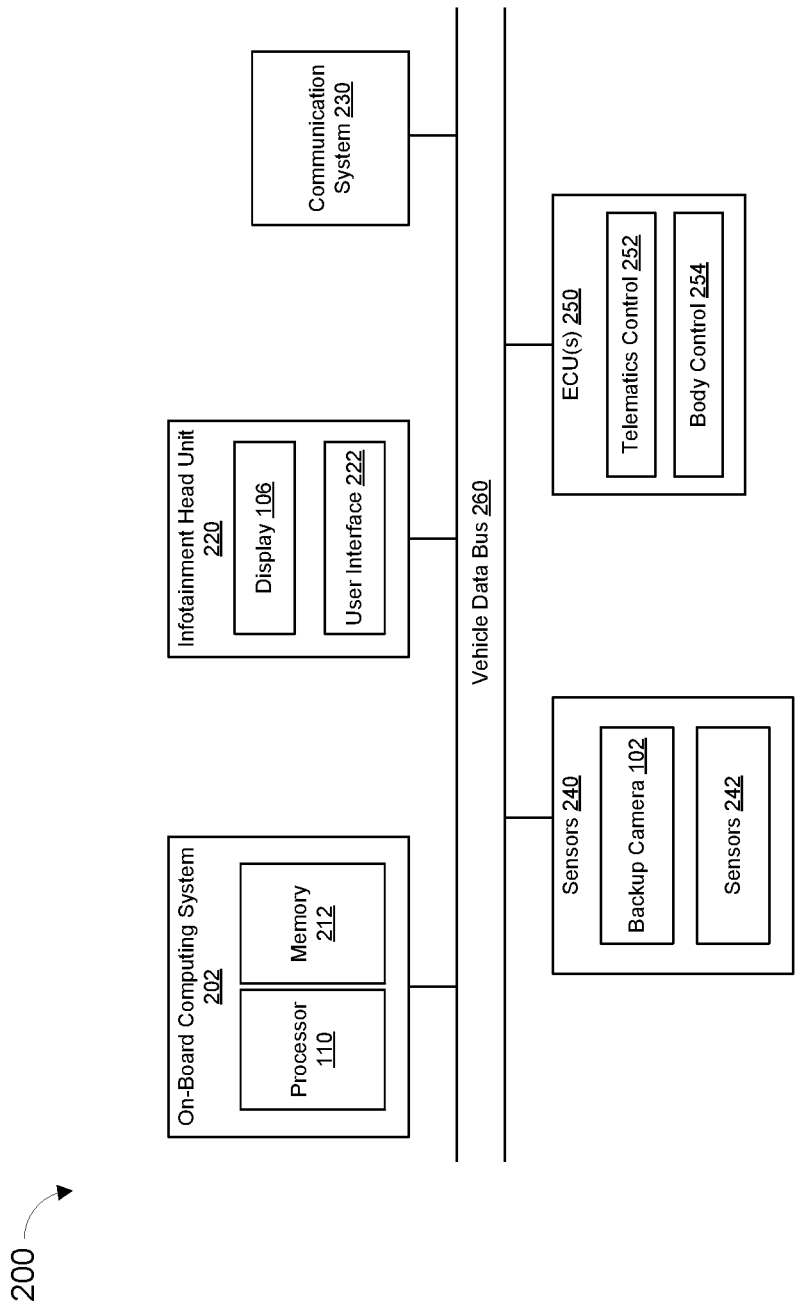
FIG. 2 illustrates a block diagram illustrating example electronic components of the vehicle of FIG. 1, according to embodiments of the present disclosure.

FIG. 2 illustrates an example block diagram 200 showing electronic components of vehicle 100, according to some embodiments. In the illustrated example, the electronic components 200 include an on-board computing system 202, an infotainment head unit 220, a communication system 230, sensors 240, electronic control unit(s) 250, and vehicle data bus 260.

The on-board computing system 202 may include a microcontroller unit, controller or processor 110 and memory 212. The processor 110 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 212 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory 212 includes multiple kinds of memory, particularly volatile memory and non-volatile memory.

The memory 212 may be a non-transitory computer-readable media on which one or more sets of instructions, such as the software for operating the methods of the present disclosure, can be embedded. The instructions may embody one or more of the methods or logic as described herein. For example, the instructions reside completely, or at least partially, within any one or more of the memory 212, the computer-readable medium, and/or within the processor 110 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The infotainment head unit 220 may provide an interface between vehicle 100 and a user. The infotainment head unit 220 may include one or more input and/or output devices, such as display 106 and user interface 222, to receive input from and display information for the user(s). The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a head-up display, a center console display (e.g., a liquid crystal display (LCD), an organic light emitting diode (OLED) display, a flat panel display, a solid state display, etc.), and/or speakers. In the illustrated example, the infotainment head unit 220 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). In some examples the infotainment head unit 220 may share a processor with on-board computing system 202. Additionally, the infotainment head unit 220 may display the infotainment system on, for example, a center console display of vehicle 100.

Communications system 230 may include wired or wireless network interfaces to enable communication with one or more internal or external systems, devices, or networks. Communications system 230 may also include hardware (e.g., processors, memory, storage, etc.) and software to control the wired or wireless network interfaces. In the illustrated example, communications system 230 may include a Bluetooth® module, a GPS receiver, a dedicated short range communication (DSRC) module, an Ultra-Wide Band (UWB) communications module, a WLAN module, and/or a cellular modem, all electrically coupled to one or more respective antennas.

The cellular modem may include controllers for standards-based networks (e.g., Global System for Mobile Communications (GSM), Universal Mobile Telecommunications System (UMTS), Long Term Evolution (LTE), Code Division Multiple Access (CDMA), WiMAX (IEEE 802.16m); and Wireless Gigabit (IEEE 802.11ad), etc.). The WLAN module may include one or more controllers for wireless local area networks such as a Wi-Fi® controller (including IEEE 802.11 a/b/g/n/ac or others), a Bluetooth® controller (based on the Bluetooth® Core Specification maintained by the Bluetooth® Special Interest Group), and/or a ZigBee® controller (IEEE 802.15.4), and/or a Near Field Communication (NFC) controller, etc. Further, the internal and/or external network(s) may be public networks, such as the Internet; a private network, such as an intranet; or combinations thereof, and may utilize a variety of networking protocols now available or later developed including, but not limited to, TCP/IP-based networking protocols.

Communications system 230 may also include a wired or wireless interface to enable direct communication with an electronic device (such as a mobile device of a user). An example DSRC module may include radio(s) and software to broadcast messages and to establish direct connections between vehicles and between vehicles and one or more other devices or systems. DSRC is a wireless communication protocol or system, mainly meant for transportation, operating in a 5.9 GHz spectrum band.

Sensors 240 may be arranged in and around vehicle 100 in any suitable fashion. Sensors 240 may include backup camera 102, and one or more sensors 242.

The ECUs 250 may monitor and control subsystems of vehicle 100. ECUs 250 may communicate and exchange information via vehicle data bus 260. Additionally, ECUs 250 may communicate properties (such as, status of the ECU 250, sensor readings, control state, error and diagnostic codes, etc.) to and/or receive requests from other ECUs 250. Some vehicles may have seventy or more ECUs 250 located in various locations around the vehicle communicatively coupled by vehicle data bus 260. ECUs 250 may be discrete sets of electronics that include their own circuit(s) (such as integrated circuits, microprocessors, memory, storage, etc.) and firmware, sensors, actuators, and/or mounting hardware. In the illustrated example, ECUs 250 may include the telematics control unit 252 and the body control unit 254.

The telematics control unit 252 may control tracking of the vehicle 100, for example, using data received by a GPS receiver, communication system 230, and/or one or more sensors 240. The body control unit 254 may control various subsystems of the vehicle. For example, the body control unit 254 may control a trunk latch, windows, power locks, power moon roof control, an immobilizer system, and/or power mirrors, etc.

Vehicle data bus 260 may include one or more data buses, in conjunction with a gateway module, that communicatively couple the on-board computing system 202, infotainment head unit 220, communications module 230, sensors 240, ECUs 250, and other devices or systems connected to the vehicle data bus 260. In some examples, vehicle data bus 260 may be implemented in accordance with the controller area network (CAN) bus protocol as defined by International Standards Organization (ISO) 11898-1. Alternatively, in some examples, vehicle data bus 260 may be a Media Oriented Systems Transport (MOST) bus, or a CAN flexible data (CAN-FD) bus (ISO 11898-7) or a combination of CAN and CAN-FD.

Figure 3:
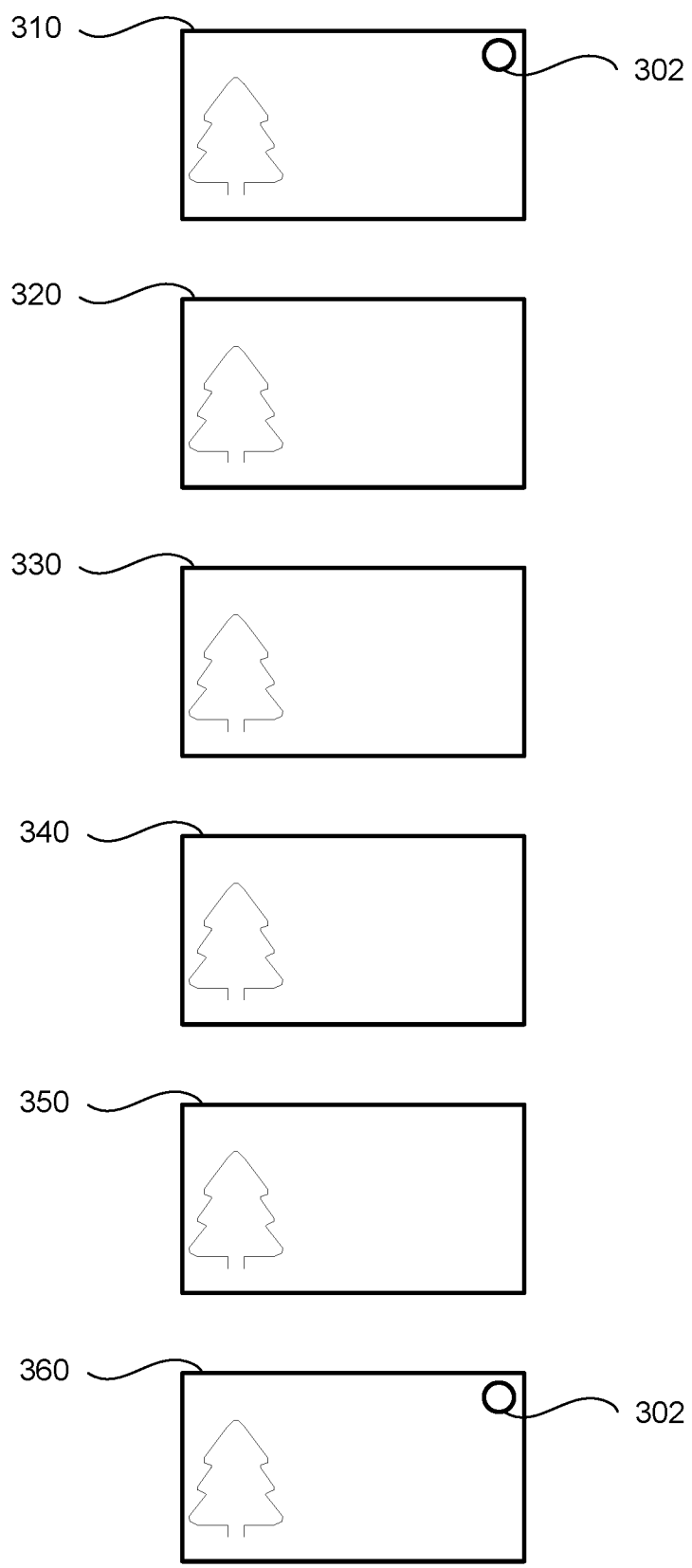
FIG. 3 illustrates an example series of image frames according to embodiments of the present disclosure.

FIG. 3 illustrates an example series of image frames 310-360 captured by a camera (such as camera 102) according to an embodiment, wherein the image frames 310-360 are provided via a display (such as display 106) to a user. As illustrated, image frames 310 and 360 are selected image frames, for which various pixels have been replaces with the icon 302. Icon 302 is a static icon having the same position on both selected image frames 310 and 360. The series of image frames 310-360 is a subset of a larger group of image frames, and illustrates that every fifth image frame is selected to include the icon 302. When the image frames of FIG. 3 are output via a display (such as display 106), the icon 302 will appear as a blinking circle.

It should be understood that although the icon 302 is shown as a black circle in FIG. 3, various other shapes, colors, positions, and other characteristics of the icon 302 may be used instead or in addition.

Figure 4:
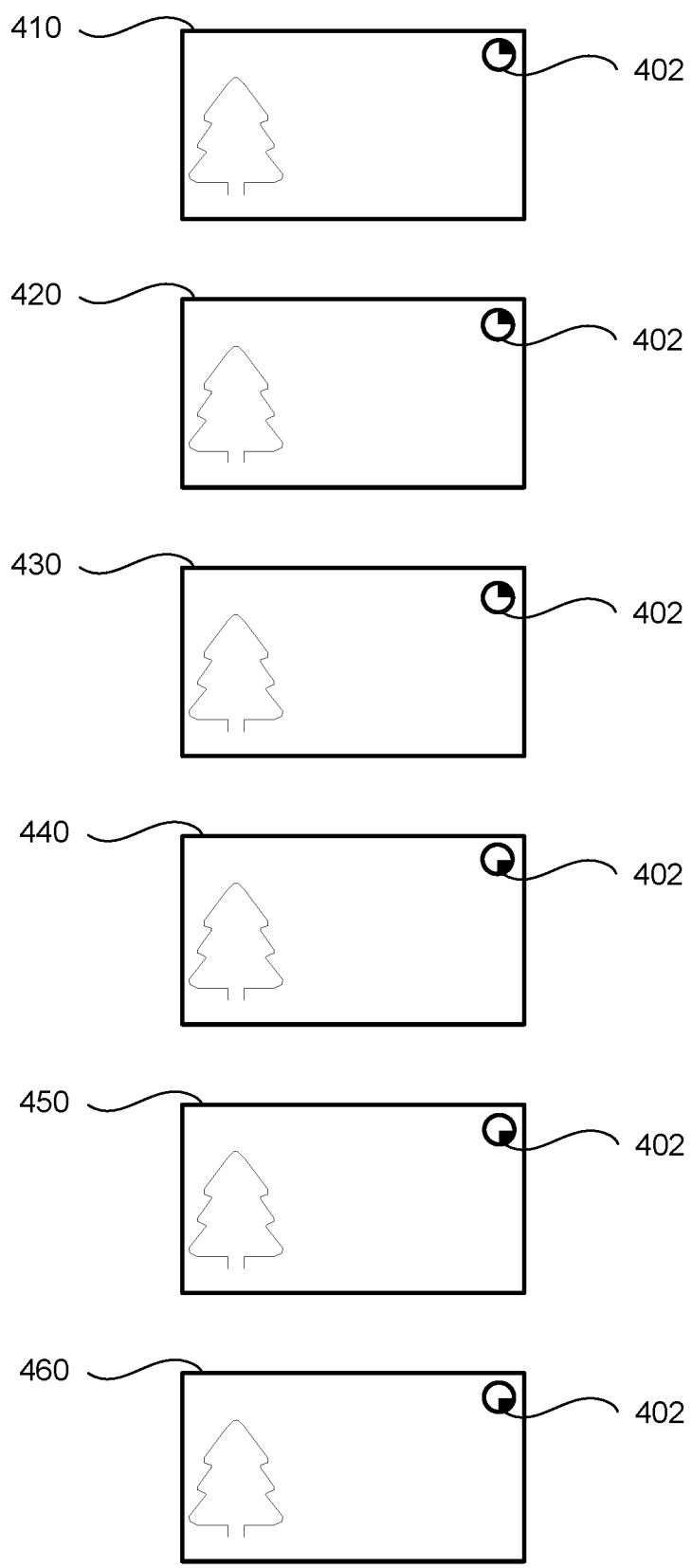
FIG. 4 illustrates a second example series of image frames according to embodiments of the present disclosure.

FIG. 4 is similar in one or more respects to FIG. 3. In particular, FIG. 4 illustrates a second example series of image frames 410-460 provided via a display. FIG. 4, however, includes a dynamic icon 402. Image frames 410-460 are all selected image frames in which the pixels are replaced with icon 402. Icon 402 in image frames 410, 420, and 430 includes a filled in upper right quadrant, while the icon 402 in image frames 440, 450, and 460 includes a filled in lower right quadrant. Image frames 410-460 illustrate the first six frames of a larger series of image frames. When these frames are displayed at an appropriate frame rate, the icon will appear to have a filled in quadrant that rotates around this circle of the icon.

It should be understood that FIGS. 3 and 4 illustrate two example icons in which the icon position remains the same between selected image frames, and that many other examples may be used instead or in addition wherein the icon changes size, shape, location, or any other characteristic.

Figure 5:
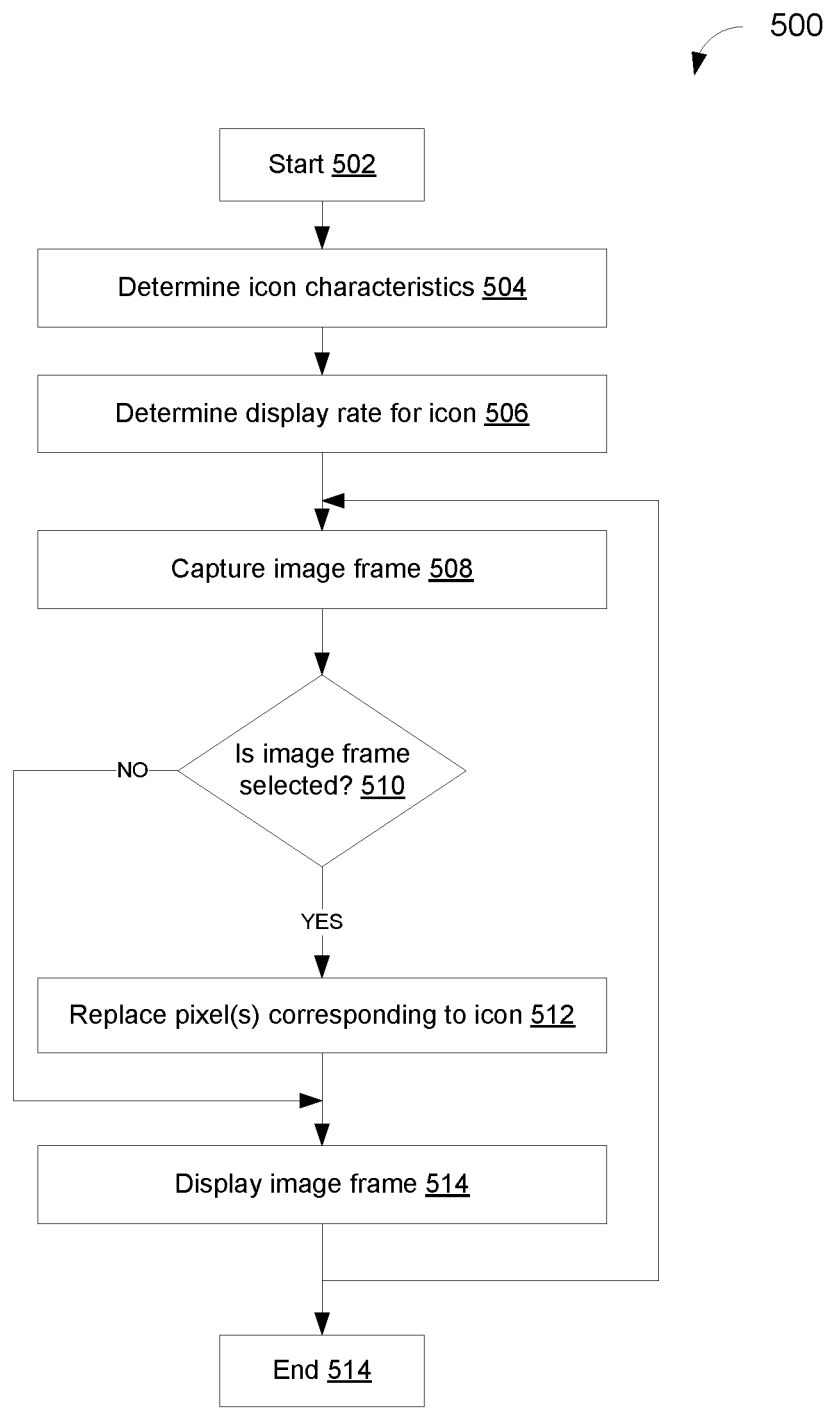
FIG. 5 illustrates a flow chart of an example method according to embodiments of the present disclosure.

FIG. 5 illustrates a flowchart of an example method 500 according to embodiments of the present disclosure. Method 500 may enable a vehicle user to quickly determine whether a video feed from a vehicle camera has frozen.

The flowchart of FIG. 5 is representative of machine readable instructions that are stored in memory (such as memory 212) and may include one or more programs which, when executed by a processor (such as processor 110) may cause vehicle 100 to carry out one or more functions described herein. While the example program is described with reference to the flowchart illustrated in FIG. 5, many other methods for carrying out the functions described herein may alternatively be used. For example, the order of execution of the blocks may be rearranged or performed in series or parallel with each other, blocks may be changed, eliminated, and/or combined to perform method 500. Further, because method 500 is disclosed in connection with the components of FIGS. 1-4, some functions of those components will not be described in detail below.

Method 500 may start at block 502. At block 504, method 500 may include determining one or more icon characteristics. This can include determining the position, orientation, shape, size, color, blinking or flashing frequency, or any other characteristic of the icon that will be used.

At block 506, method 500 may include determining a display rate for the icon. This can include selecting one or more image frames, or determining which image frames will be selected once they are captured. For example, this can include making a determination to select every received image frame, every other image frame, every fifth image frame, a series of several frames in a row separated by one or more image frames, or any other combination of selected image frames.

At block 508, method 500 may include capturing an image frames via a camera. At block 510, method 500 may include determining whether the capture image frame is a selected image frame.

If the captured image frame is selected, method 500 may include replacing one or more pixels of the image frame with the icon based on the icon characteristics determined at step 504.

Method 500 may then include displaying the image frame at block 514. Method 500 may then proceed back to block 508 in which another frame is captured. It should be understood that image frames may be captured while other image frames are being displayed to a user, and that a first frame need not be fully displayed before a next frame is captured.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". As used here, the terms "module" and "unit" refer to hardware with circuitry to provide communication, control and/or monitoring capabilities, often in conjunction with sensors. "Modules" and "units" may also include firmware that executes on the circuitry. The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
a camera;
a display; and
a processor configured to:
capture a plurality of image frames via the camera;
select a first image frame and a second image frame of the image frames, wherein to select the first image frame and the second image frame of the image frames comprises:
arranging the image frames sequentially in time; and
selecting a third image frame,
wherein the third image frame follows the second image frame, and the third image frame follows the first image frame, and wherein the first image frame and the second image frame have a first interval therebetween, wherein the second image frame and the third image frame have a second interval therebetween, the first interval being different than the second interval;
replace one or more first pixels of the first image frame with a first icon;
replace one or more second pixels of the second image frame with a second icon; and
output the plurality of image frames on the display.

2. The vehicle of claim 1, wherein the plurality of image frames each comprise an array of pixels each having a pixel value; and wherein replacing the one or more first pixels of the first image frame comprises changing the pixel value for each of the one or more first pixels.

3. The vehicle of claim 1, wherein each of the first icon and the second icon comprises a static icon, wherein a static icon shape and color are the same in each selected image frame.

4. The vehicle of claim 1, wherein a first icon shape or color of the first icon is different than a second icon shape or color of the second icon.

5. The vehicle of claim 1, wherein an icon position of each of the first icon and the second icon is static with respect to each of the first and second image frames, such that a center of each of the first icon and the second icon is located in the same position on each of the first image frame and the second image frame.

6. The vehicle of claim 1, wherein a first icon position of the first icon is different than a second icon position of the second icon.

7. The vehicle of claim 1, wherein the processor is further configured to replace the one or more first pixels of the first image frame with the first icon simultaneously with the capturing of the first image frame.

8. A method comprising:
capturing, via a camera, a plurality of image frames;
selecting a first image frame and a second image frame of the image frames, wherein selecting the first image frame and the second image frame of the image frames comprises:
arranging the image frames sequentially in time;
selecting a first plurality of the image frames at a predetermined frequency during a first time period, wherein the first plurality of the image frames comprise the first image frame; and
selecting a second plurality of the image frames at the predetermined frequency during a second time period, wherein the second plurality of the image frames comprise the second image frame, and wherein the first time period and the second time period are noncontiguous;
replacing one or more first pixels of the first image frame with a first icon; and
replacing one or more second pixels of the second image frame with a second icon; and
outputting the plurality of image frames on a display.

9. The method of claim 8, wherein the plurality of image frames each comprise an array of pixels each having a pixel value, and wherein replacing the one or more first pixels of the first image frame comprises changing the pixel value for each of the one or more first pixels.

10. The method of claim 8, wherein each of the first icon and the second icon comprises a static icon, wherein a static icon shape and color are the same in each selected image frame.

11. The method of claim 8, wherein a first icon shape or color of the first icon is different than a second icon shape or color of the second icon.

12. The method of claim 8, wherein an icon position of each of the first icon and the second icon is static with respect to the first and second image frames, such that a center of each of the first icon and the second icon is located in the same position on each of the first image frame and the second image frame.

13. The method of claim 8, wherein a first icon position of the first icon is different than a second icon position of the second icon.

14. The method of claim 8, further comprising: replacing the one or more first pixels of the first image frame with the first icon simultaneously with the capturing of the first image frame.

15. A system for live video freeze detection comprising:
a camera;
a display; and
a processor configured to:
capture a plurality of image frames via the camera;
select a first image frame and a second image frame of the image frames, wherein to select the first image frame and the second image frame of the image frames comprises:
arranging the image frames sequentially in time;
selecting a first plurality of the image frames at a predetermined frequency during a first time period, wherein the first plurality of the image frames comprise the first image frame; and
selecting a second plurality of the image frames at the predetermined frequency during a second time period, wherein the second plurality of the image frames comprise the second image frame, and wherein the first time period and the second time period are noncontiguous;

replace one or more first pixels of the first image frame with a first icon;
replace one or more second pixels of the second image frame with a second icon; and
output the plurality of image frames on the display.

16. The system of claim 15, wherein the processor is further configured to replace the one or more first pixels of the first image frame with the first icon simultaneously with the capturing of the first image frame.

* * * * *